Feb. 16, 1943. R. A. SHOAN 2,311,573
MATERIAL FOR WRAPPING PIPES AND FOR COVERING METALLIC SURFACES
Filed May 4, 1940
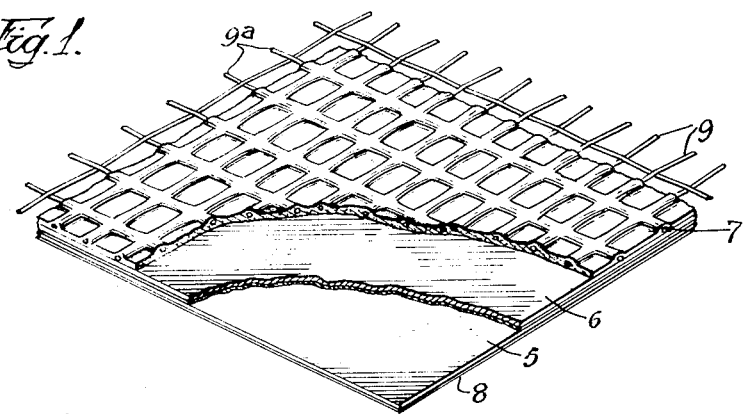
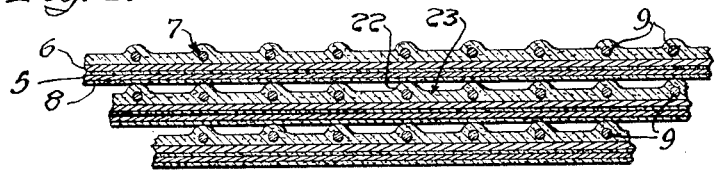
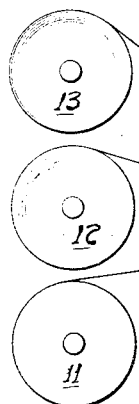

Patented Feb. 16, 1943

2,311,573

UNITED STATES PATENT OFFICE 2,311,573

MATERIAL FOR WRAPPING PIPES AND FOR COVERING METALLIC SURFACES

Raymond A. Shoan, Chicago, Ill., assignor to Dearborn Chemical Company, Chicago, Ill., a corporation of Illinois Application May 4, 1940, Serial No. 333,333

5 Claims. (Cl. 154—44)

This invention relates to improvements in material for wrapping pipes and for covering metallic surfaces as a protection against corrosion and it consists of matters hereinafter described and more particularly pointed out in the appended claims.

Material for this purpose, when of the composite type, relies upon the combined thickness of the various plies for mechanical strength, resistance to soil and bacterial action, stray electrical currents and for the exclusion of moisture and oxygen from the previously coated or the uncoated surface of an underground pipe. Usually the various plies, each in itself may not possess much mechanical strength, but when said plies are laminated into a composite material, they mutually coact to reenforce each other in such strength. In some instances material of this kind may include an elastic protective coating of an adhesive character so as to provide an effective seal at the overlap of adjacent portions on the surface to be protected and to insure a good contact throughout or between said material and said surface.

In some instances, it may be desired that one of the plies of the composite material be a substance, partly or completely made of a mineral fibre, so as to increase the resistance of the material to mold and bacterial action which occurs underground. As one substance of this kind, asbestos is mentioned as an example. As another substance of this kind so-called "Spun silica sheeting," which comprises felted glass or silica fibres in sheet form, is mentioned. Asbestos in sheet form does not have much resistance to tearing, due to the felted condition of its fibres, but it offers considerable resistance to the abrasive action resulting from engagement by earth clods and stones when filling a ditch containing the wrapped pipe. Asbestos in itself, however, is not moisture-proof and if not properly treated in the production of the material in which it is embodied, it will have to be of such a thickness as will make it too stiff and rigid, as well as too costly for practical use.

Material of this kind is more often produced in the form of rolls better for handling in storage and in application to a pipe or other metal surface either by hand or by machine. Often material of this kind is stored in the open, adjacent the field of application to a pipe. In relatively cool temperatures, where such material is of the coated type, the engaging coated surfaces of the material will release themselves or separate for a practical unwinding of the material as a strip.

However, the coated material is often stored in the open, at the field of operation, in the direct rays of the sun for an appreciable length of time. Under such conditions, the coating, which is sensitive to temperature changes, will cause a sticking between the adjacent convolutions of the roll.

When such sticking is present, difficulty is encountered in unwinding the material as a strip from the roll. Often the sticking tendency is such that if the unwinding is "forced," a tearing of the strip results, or areas of the coating on the surface of the strip will pull away from the substance of the plies thereof. This exposes the substance of the plies and produces a condition which the coating is intended to prevent.

One of the objects of the invention is to provide a material of this kind which is of the composite type and includes a substance containing mineral fibres among the plies thereof with which other plies coact to impart that mechanical strength necessary in the finished material to make its use practicable.

Another object of the invention is to provide a material of this kind which includes a substance containing mineral fibres so treated as to make the same moisture-proof as well as more effectively bind such fibres together whereby a thinner substance has more strength against tearing and has more resistance to mold and bacterial action when the material is in underground use.

Also, it is an object of the invention to provide a material of this kind which is easier to unwind from a roll under high temperature conditions, without tearing, and without parts of the coating pulling away from the substance of the plies of the material.

The above mentioned objects of the invention, as well as others, together with the several advantages thereof, will more fully appear as the specification proceeds.

In the drawing:

Fig. 1 is a perspective view of a piece of the improved material for wrapping pipes and embodying the preferred form of the invention.

Fig. 2 is a transverse sectional view through several thicknesses of the improved material, on an enlarged scale and shows more particularly the manner in which one side of one thickness of the material has a plurality of point-like engagements with the other side of an adjacent thickness for an easier separation between said thicknesses.

Fig. 3 is a diagrammatic view of an apparatus for producing the improved material shown in Figs. 1 and 2.

Fig. 4 is a detail sectional view, on the scale of Fig. 2, showing a modified form of the improved material which will be more fully referred to later.

One form of the improved wrapping material, and which is best shown in Figs. 1 and 2, is preferably produced in strip or sheet form. It comprises a plurality of plies 5, 6 and 7 respectively and a coating 8 disposed between and covering the plies 5 and 6 and in which the ply 7 is embedded, as will later appear. The ply 5 is preferably constituted by a relatively thin, pliable imperforate sheet of cellulosic material selected from a group embodying a regenerated cellulose, a cellulose acetate and a cellulose nitrate. Material in sheet form made from or containing casein or vinylite may also be used for this ply. Material such as "Cellophane" (regenerated cellulose in sheet form) or "Kodopak" (cellulose acetate in sheet form) are both obtainable in strip and in sheet form, in the open market, and either one well serves the purpose of the ply 5 for the improved material. The ply 5, which has smooth surfaces on both sides, has considerable dielectric and tensile strength but it is not totally vapor or moisture-proof.

The ply 6 is constituted by a sheeted substance made partly or entirely of mineral fibres. Sheeted asbestos and "Spun silica sheeting" have been mentioned as examples of such a substance. As the fibres in sheeted asbestos are only felted together, it does not have much mechanical strength in itself, so as to be resistant to a tearing strain. However, it is quite resistant to mold and bacterial action which occurs underground and it has considerable resistance to abrasive action. Again sheeted asbestos costs less than spun silica sheeting and therefore it is the preferred substance for this purpose.

The material for the coating 8 is of a plastic or somewhat elastic nature having an adhesive character. It is made with a petrolatum base and is of a heavy grease or wax-like consistency. One form of satisfactory coating is made from a petrolatum or mixture of petrolatums having an A. S. T. M. melting point of from about 140° to 175° F. and an A. S. T. M. penetration of from 30 to 45 seconds, using 100 grams at 77° F. for five seconds.

Another form of satisfactory coating consists of a mixture of a petrolatum having an A. S. T. M. melting point of from 125° to 160° F. and an A. S. T. M. penetration over 35 seconds using 100 grams at 77° F. for 5 seconds, with paraffin wax having an A. S. T. M. melting point of from 140° to 160° F. and an A. S. T. M. penetration of 5 to 15 seconds using 100 grams at 77° F.

A third satisfactory coating consists of a mixture of a petrolatum having an A. S. T. M. melting point of from 125° to 160° F. and an A. S. T. M. penetration over 35 seconds using 100 grams at 77° F. for 5 seconds, with a wax such as paraffin wax having an A. S. T. M. melting point of from 120° to 135° F. A small amount of a material selected from the following group: rosin, carnauba wax, candelilla wax and montan wax, may be embodied in the coating to cause the same to set or harden. To any one of the examples above set forth, a chemical inhibitor may be added.

Any one of the above mentioned coatings in film form, is vapor- or moisture-proof, remains permanently plastic, has a permanent wetting effect so that it will maintain contact with a metal surface under normal application pressure for an indefinite period of time and has good dielectric properties. At the same time it may be thinned for application to the plies 5—6 and 7 either by the use of heat or by the use of a hydro-carbon solvent such as kerosene, naphtha or oleum spirits. After application, if solvents are employed, the same evaporate, leaving a firm but elastic wax-like film. This film which is highly resistant to moisture permeation, also has dielectric qualities and will retain it adhesiveness thereby providing a tight seal at the overlap when the finished material is wrapped about the coated or uncoated surface of pipe or laid as a covering upon any other surface to be protected. When such a coating includes a chemical inhibitor, it maintains the inhibitor in intimate contact with the surface being protected, in those instances where the coating directly engages the metal.

The adherence of the coating is affected by temperature, being of a greater intensity in a high temperature and of a lesser intensity in a lower temperature. However, at a normal medium temperature, the adherence of the coating of the thicknesses or plies in adjacent convolutions in a roll is such that said coatings will release or separate from each other. The release or separation of said coatings, however, is with some resistance or difficulty in unwinding a strip of the material from a roll but without pulling away or separating from the ply that carries the same.

One coating which I find satisfactory for this purpose and which contains a chemical inhibitor is a proprietary product obtainable in the open market under the trade name of No-Ox-Id. It has a hydro-carbon base, consisting of proportioned amounts of petrolatum products and having incorporated therein certain chemicals for the purpose of inhibiting corrosion.

The reenforcing material 7 is constituted by a relatively fine thread cotton fabric having relatively large open mesh and includes warp threads 9 and weft threads 9a. I find that the so-called "tobacco" cloth well fills the purpose and the cost thereof is such as to make its use practical. Such a cloth has approximately 20 warp threads to the inch and 12 weft threads to the inch and the spacing between said threads in both dimensions of the fabric has dimensions several times the diameter of said threads. In itself, it has very little strength but when combined with other sheeted substances as mentioned herein, the fabric and said substances mutually coact to provide a strong composite material. In the finished material, the plies 5 and 6 impart a "body" to the fabric and the fabric reenforces said plies against tearing. At the same time, the fabric produces spaced apart areas in its part of the coating for engagement by the coating of the next thickness or convolution of the material engaged therewith when the finished material is in roll form. Thus, the various convolutions readily separate even under relatively high temperature conditions in the unwinding or unrolling of the finished material from a roll as will be mentioned later.

The coating material is preferably applied to both plies 5 and 6 and to the fabric 7 simultaneously. One convenient way of performing this operation is shown diagrammatically in Fig. 3 and wherein 10 indicates a tank for holding a quantity of the coating 8 made liquid for application purpose either by the use of heat or by the addition of a solvent.

Supply rolls 11, 12 and 13 for the plies 5 and 6 and the fabric 7 respectively, are disposed toward one end of the tank at different elevations. Said plies, as well as a strip of the fabric 7 pass over vertically spaced idler rolls 14, 15 and 16 respectively and then under a roll 18 at least a portion of which is disposed in the bath of liquid coating 8 in the tank 10.

By reason of the arrangement of the rolls 14, 15 and 16, it is apparent that the plies 5 and 6 and the fabric 7 are coated on both sides before they reach the roll 18 to pass under the same. As said plies and fabric pass under the roll 18, they are arranged in a superposed laminated engagement and are united together by the parts of the coating between them.

The said plies and the fabric, disposed or laminated in said operative position, pass out of the bath of liquid in the tank 10, and then in between a pair of squeeze rolls 19 and 20 respectively to form the finished material. These rolls also express the excess of the coating from said plies and fabric, insure a proper evening of the coating and produce a smooth surface for the coating on the underside of the ply 5. After the finished material leaves the squeeze rolls 19 and 20, it is wound in successive convolutions into a roll 21. It is pointed out that the roll 21 is located at such a distance away from the rolls 19 and 20 that the coating has time to set. When the material thus made is relatively wide, the roll 21 is slit into narrow strips which are rewound into narrower rolls for convenient application to the pipe or other metallic surface, either coated or uncoated, to be covered and protected.

As the fabric 7, in strip form, passes through the coating material in the tank 10 on its way to pass under the roll 18, it will, due to the fibrous structure, absorb some of the coating so that it becomes substantially impregnated therewith, as well as coated or covered thereby. The coating material thus absorbed acts as a bond between the fibres of the fabric 7 and materially increases its mechanical strength and resistance to tearing.

It is pointed out and is illustrated in Fig. 2 on an exaggerated scale that the warp and weft threads 9 and 9a respectively of the fabric do not bear directly upon the ply 6 but are embedded in the coating. It is further pointed out that the thickness of the coating on the fabric side of the ply 6 between the warp and weft threads is such as to be spaced below the top surface of the coating at the intersection of said warp and weft threads. Thus when the flat bottom surface of the coating on the underside of the ply 5 in one convolution engages the coating at the intersection of the coated threads 9 and 9a of the proceeding convolution, the intersections provide spaced points of engagement 22 for said bottom surface, and the coating of both convolutions between said threads define closed air cells or spaces 23. These points of engagement 22 and cells 23 best appear in Fig. 2.

Thus the area of contact between the convolution of the roll is not a continuous one wherein all air is expressed from between the same to produce the suction or intimate seizure between said surface but it is one made up of innumerable spaced areas of contacts with air cells or spaces therebetween. Thus as a strip of the finished material is being unwound from a roll in the helical application of said material (either by hand or machine) to a pipe, the convolutions separate easily even under high temperature conditions.

In the application of a strip of the material from a roll to a pipe, said strip is wound helically upon the surface of the pipe with a marginal overlap and with the smooth even surface of the coating on the underside of the strip, in engagement with said surface of the pipe. In this winding of the material in strip form upon said surface of the pipe, a considerable tension is present therein so as to avoid the formation of wrinkles or blisters in the applied material. However, as the fabric is intimately bonded to the ply 6 which in turn is intimately bonded to the ply 5, by parts of the coating 8, said plies will not tear transversely when the material is being applied.

While the ply 5 has a high tensile strength in itself, this strength is increased by the fabric and the ply 6 has its strength increased by the play 5 and the fabric 7. As the plies 5 and 6 have a high dielectric strength and as the coating has a high dielectric strength and is also impervious to vapor or moisture penetration, the coating adds its dielectric strength to that of the plies and also acts to prevent the penetration of vapor or moisture through either ply 5 or 6. Likewise, the coating with which the ply 6 is impregnated increases the strength and the resistance of the ply 6 just above mentioned. Also, as the coating surrounds each thread of the fabric 7, it protects the threads from moisture which would soon make them deteriorate.

In Fig. 4 I have shown a modified form of wrapping material wherein instead of employing only a single ply 5 of cellulosic or other sheeted substance before mentioned in the material on one side of the ply 6, I may use a ply on each side of the ply 6. In said Fig. 4, the plies of cellulosic or other sheeted substance as before mentioned are indicated at 5a and 5b respectively and the ply of asbestos is indicated at 6a, all of which as well as the threads of the fabric 7 are enclosed in coating 8.

In certain soils, bacteria are present of a type which uses the carbon of petroleum products for partial sustenance. It is, therefore, important that such bacteria be at least kept from contact with that part of the coating which is in engagement with the metal surface to be protected. In the present material, the plies 5 and 6 act as a filter against such bacteria.

The improved material is of a high dielectric strength and resistance to not only tearing but to vapor and moisture penetration and is relatively thin so that it is possible to provide a large footage thereof in a roll convenient for handling in applying the same to a pipe.

The impregnated substance 6 increases the resistance of the material to bacteria, and stray electrical currents, as well as to moisture penetration and abrasive action of earth clods and stones when filling in a ditch in which the covered pipe is disposed.

Again, the construction of the material is such that while it will seal itself upon a pipe because of the adhesive character of the coating, it will unroll easily without causing offsetting of the material from one side of one convolution to that side of the next convolution with which it is engaged.

While in describing the invention I have referred in detail to the arrangement of the parts involved, as well as to the material or substance of which they are composed, the same is to be considered only in the illustrative sense so that I do not wish to be limited thereto except as may be specifically set forth in the appended claims.

I claim as my invention:

1. A composite material for use in protecting metallic surfaces and embodying therein a flexible mineral fibrous sheet and a relatively thin flexible non-fibrous, plastic imperforate sheet having considerable dielectric and tensile strength but not in itself totally vapor and moisture proof, a heavy grease-like petrolatum base protective coating that is vapor and moisture proof and has a non-drying adhesive character as well as a high dielectric strength covering one side of the first mentioned sheet and uniting it to the second mentioned sheet, and a relatively open mesh textile fabric of warp and weft threads enclosed in said coating and reinforcing said sheets against tearing and coacting therewith in strengthening the material as a whole and forming a surface having raised portions following the pattern of said threads on one side thereof that will stick to surfaces such as on the other side of the material when engaged therewith, but will release therefrom when said surfaces are being manually separated.

2. A composite material for use in protecting metallic surfaces and embodying therein a flexible mineral fibrous sheet and a relatively thin flexible non-fibrous, plastic imperforate sheet having considerable dielectric and tensile strength, but not in itself totally vapor and moisture proof, a heavy grease-like petrolatum base protective coating that is vapor and moisture proof and has a non-drying adhesive character as well as a high dielectric strength covering one side of the first mentioned sheet and uniting it to the second mentioned sheet, and a relatively open mesh textile fabric of warp and weft threads enclosed in said coating and reinforcing said sheets against tearing and coacting therewith in strengthening the material as a whole and forming a surface having raised portions following the pattern of said threads on one side thereof that will stick to surfaces such as on the other side of the material when engaged therewith, but will release therefrom when said surfaces are being manually separated, said coating penetrating said mineral fibrous sheet at least in part and unifying the fibres thereof.

3. A composite material for use in protecting metallic surfaces and embodying therein a flexible mineral fibrous sheet and a relatively thin flexible non-fibrous imperforate sheet having considerable dielectric and tensile strength but not in itself totally vapor and moisture proof, selected from a group consisting of cellulose derivatives, vinyl resins and casein, on one side of the first sheet, a heavy grease-like petrolatum base protective coating that is vapor and moisture proof and has a non-drying adhesive character as well as a high dielectric strength enclosing the first mentioned sheet and uniting it to the second mentioned sheet, and a relatively open mesh textile fabric of warp and weft threads on the other side of the first sheet and enclosed in said coating and reinforcing said sheets against tearing and coacting therewith in strengthening the material as a whole and forming a surface having raised portions following the pattern of said threads on one side thereof that will stick to surfaces such as on the other side of the material when engaged therewith but will release therefrom when said surfaces are being manually separated.

4. A composite material for use in protecting metallic surfaces and embodying therein a flexible asbestos sheet and a relatively thin flexible non-fibrous, plastic imperforate sheet having considerable dielectric and tensile strength but not in itself totally vapor and moisture proof, disposed on one side of the asbestos sheet, a heavy grease-like petrolatum base protective coating that is vapor and moisture proof and has a non-drying adhesive character as well as a high dielectric strength covering at least one side of the asbestos sheet and uniting it to the second mentioned sheet, and a relatively open mesh textile fabric of warp and weft threads enclosed in a part of the coating and reinforcing said sheets against tearing and coacting therewith in strengthening the material as a whole and forming a surface having raised portions following the pattern of said threads on one side thereof that will stick to surfaces such as on the other side of the material when engaged therewith but will release therefrom when said surfaces are being manually separated.

5. A composite material for use in protecting metallic surfaces and embodying therein a flexible sheet of felted silica fibres and a relatively thin flexible non-fibrous plastic imperforate sheet having considerable dielectric and tensile strength but not in itself totally vapor and moisture proof, a heavy grease-like petrolatum base protective coating that is vapor and moisture proof and has a non-drying adhesive character as well as a high dielectric strength enclosing said first and second mentioned sheets and uniting them together, and a relatively open mesh textile fabric of warp and weft threads enclosed in at least a part of said coating and reinforcing said sheets against tearing and coacting therewith in strengthening the material as a whole and forming a surface having raised portions following the pattern of said threads on one side thereof that will stick to surfaces such as on the other side of the material when engaged therewith but will release therefrom when said surfaces are being manually separated.

RAYMOND A. SHOAN.